United States Patent
Iwanaga et al.

[11] Patent Number: 5,967,224
[45] Date of Patent: Oct. 19, 1999

[54] VEHICLE HEATING APPARATUS

[75] Inventors: Akihiro Iwanaga; Kazuyuki Fujioka; Yoshihiro Nasu, all of Utsunomiya; Hatsuya Higashi, Mooka, all of Japan

[73] Assignees: Keihin Corporation; Honda Giken Kogyo Kabushiki Kaisha, both of Tokyo, Japan

[21] Appl. No.: 08/911,938

[22] Filed: Aug. 15, 1997

[30] Foreign Application Priority Data

Aug. 30, 1996 [JP] Japan ..................................... 8-230068

[51] Int. Cl.$^6$ ................. B60H 3/00; F28F 7/00
[52] U.S. Cl. ................. 165/42; 165/43; 165/80.3
[58] Field of Search ................. 165/42, 43, 80.3

[56] References Cited

U.S. PATENT DOCUMENTS

| | | | |
|---|---|---|---|
| 4,546,617 | 10/1985 | Suzuki et al. | 62/180 |
| 5,086,628 | 2/1992 | Hashimoto | 62/144 |
| 5,193,609 | 3/1993 | Cowart | 165/42 |

FOREIGN PATENT DOCUMENTS

| | | |
|---|---|---|
| 6437710 | 3/1989 | Japan . |
| 2112505 | 9/1990 | Japan . |
| 538928A | 2/1993 | Japan . |

*Primary Examiner*—Ira S. Lazarus
*Assistant Examiner*—Lance Chandler
*Attorney, Agent, or Firm*—Birch, Stewart, Kolasch & Birch, LLP

[57] ABSTRACT

A heater duct is disposed between an air blower unit and an air heater unit. A plate is disposed in the heater duct near an outlet joint of the heater duct. The plate has a closure member and a plurality of through holes defined therein on opposite sides of the closure member. Air delivered under pressure from the air blower unit is divided by the closure member into air flows that pass through the through holes and are combined and mixed with each other, supplying air to the air heater unit with a desired air speed distribution. The plate, which is of a relatively simple structure, is capable of easily and reliably achieving the same air speed distribution when an evaporator is not installed as the air speed distribution when the evaporator is installed, providing an effectively increased vehicle heating capability.

11 Claims, 8 Drawing Sheets

VEHICLE HEATING APPARATUS

BACKGROUND OF THE INVENTION

1. Field of the Invention

The present invention relates to a vehicle heating apparatus having a heater duct disposed between an air blower unit and an air heater unit.

2. Description of the Related Art

Generally, heating apparatus for heating the passenger's compartment of vehicles such as automobiles comprise an air blower unit for discharging air at a given rate from air outlets in the passenger's compartment, an air heater unit with a built-in heater core for heating the air from the air blower unit before the air is discharged from the air outlets, and a heater duct disposed between the air blower unit and the air heater unit.

To convert such a heating apparatus into an air-conditioner, it has been customary to replace the heater duct with a cooling unit with a built-in evaporator. The heater duct, which is relatively expensive, is a dedicated part of the heating apparatus, and cannot be used in air-conditioners. Consequently, when a heating apparatus is converted into an air-conditioner, the removed heater duct is useless and highly uneconomical.

For this reason, there have been demands for heater ducts that can be used as cooling unit cases of air-conditioners, and various proposals have heretofore been made to meet such demands.

For example, Japanese laid-open utility model publication No. 64-37710 discloses a heater duct (hereinafter referred to as "prior art 1") that can be used as a cooler unit housing an evaporator therein, the heater duct having a flow-rectifying plate positioned therein fully across its cross section at an intermediate position and having a number of air passages for uniformizing an air flow delivered from an intake unit. According to Japanese laid-open patent publication No. 5-38928, a resistive body (hereinafter referred to as "prior art 2") is placed in a duct in which an evaporator can be mounted and has an air resistance equivalent to that of the evaporator.

According to the prior art 1, the air passages are defined at equal intervals in the flow-rectifying plate. The speed of air delivered under pressure from the blower unit to the heater duct varies depending on the position of a blower fan and the position, shape, and dimensions of a duct joint, but is highest at the center of the heater duct. Therefore, the flow-rectifying plate according to the prior art 1 is unable to obtain a uniform air speed distribution, and cannot deliver air at a uniform temperature and a desired rate from all the air outlets in the passenger's compartment.

Furthermore, because the flow-rectifying plate is positioned at the intermediate position in the heater duct, air streams that have passed through the flow-rectifying plate are combined with each other in the heater duct. As a result, a change is induced in the air speed distribution in the heater duct, making it highly difficult to achieve a uniform air speed distribution in the heater unit.

When air is delivered from the air blower with an evaporator installed in position in general air-conditioners, the speed distribution of air that has passed through the evaporator is often localized due to the position of the air blower. It is necessary to create such a localized air speed distribution even when the evaporator is not installed because the layout of various related components is designed taking into account the evaporator installed in position and a desired heating capability would not be achieved if the same localized air speed distribution were not obtained when the evaporator is not installed. The flow-rectifying plate according to the prior art 1, however, fails to obtain the same air speed distribution when the evaporator is not installed as the air speed distribution when the evaporator is installed.

The resistive body according to the prior art 2 which is placed in the duct has substantially the same outer profile and air resistance as the evaporator from a practical standpoint. While the resistive body can impose a desired air resistance, air that has passed through the heater duct does not have a desired air speed distribution at the inlet of the heater unit. Therefore, the heating apparatus cannot discharge air from the air outlets in the passenger's compartment at a desired temperature and a desired rate, and fail to provide a desired heating capability.

SUMMARY OF THE INVENTION

It is an object of the present invention to provide a heating apparatus for use in a vehicle, which is of a relatively simple structure and capable of achieving the same air speed distribution when an evaporator is not installed as the air speed distribution when an evaporator is installed, for thereby effectively increasing a heating capability in a passenger's compartment.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE DRAWINGS

Figure 1:
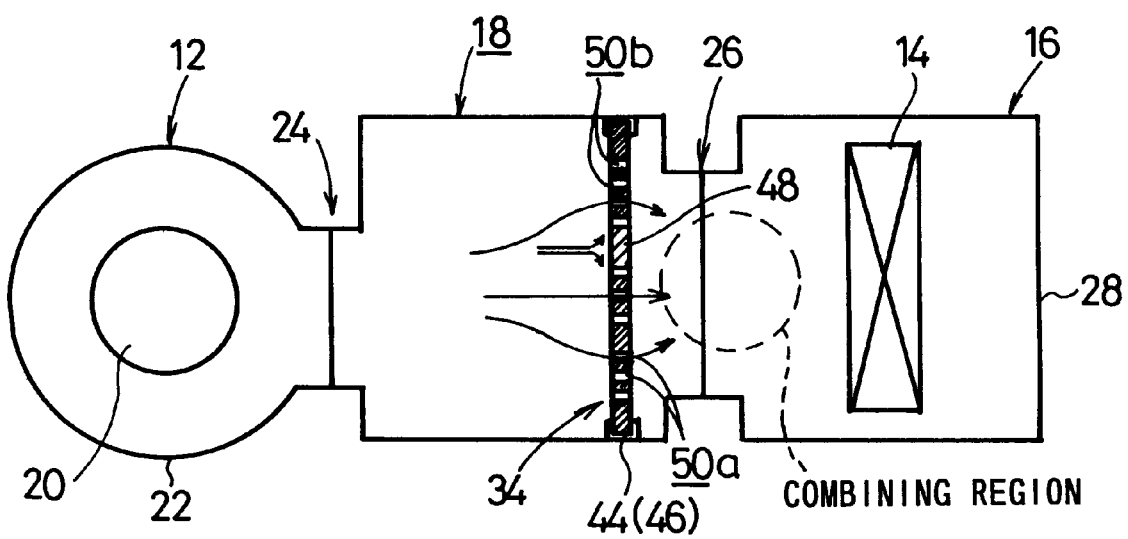
FIG. 1 is a schematic cross-sectional view of a vehicle heating apparatus according to a first embodiment of the present invention.

FIG. 1 schematically shows in cross section a vehicle heating apparatus 10 according to a first embodiment of the present invention.

The vehicle heating apparatus 10 comprises an air blower unit 12 for discharging air at a given rate from air outlets (not shown) in the passenger's compartment of a vehicle such as an automobile, an air heater unit 16 with a built-in heater core 14 for heating the air from the air blower unit 12 before the air is discharged from the air outlets, and a heater duct 18 disposed between the air blower unit 12 and the air heater unit 16.

The air blower unit 12 has a blower case 22 with an air blower 20 housed therein. The blower case 22 is connected to an inlet joint 24 of the heater duct 18, which has an outlet joint 26 connected to a heater case 28 of the heater unit 16.

Figure 2:
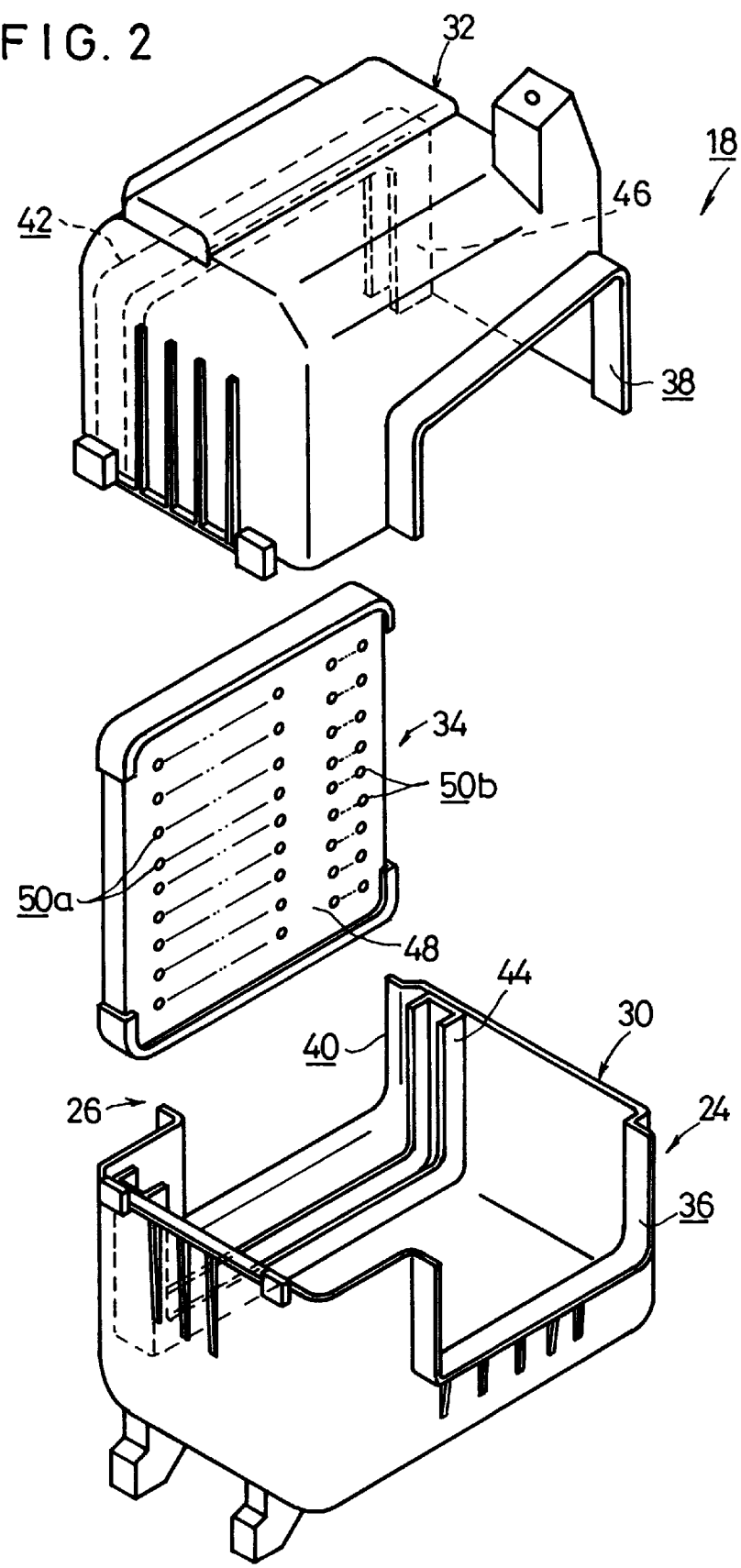
FIG. 2 is an exploded perspective view of a heater duct and a plate of the vehicle heating apparatus shown in FIG. 1.

As shown in FIG. 2, the heater duct 18 comprises a lower case 30 and an upper case 32 which hold therebetween a plate (resistive body) 34 in the vicinity of the outlet joint 26.

The lower case 30 and the upper case 32 have a first lower opening 36 and a first upper opening 38, respectively, defined in the inlet joint 24, and a second lower opening 40 and a second upper opening 42, respectively, defined in the outlet joint 26. Plate fixture guides 44, 46 are disposed in inner wall surfaces of the lower case 30 and the upper case 32 respectively near the second lower opening 40 and the second upper opening 42.

Figure 3:
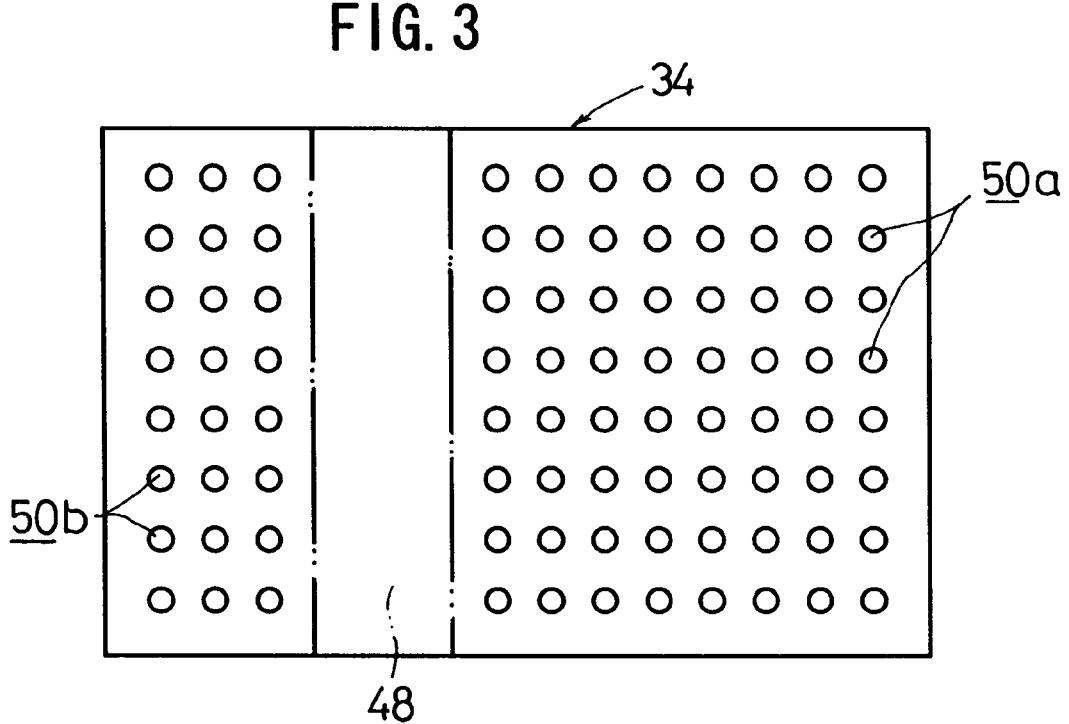
FIG. 3 is a front elevational view of the plate shown in FIG. 2.

The plate 34 has upper and lower ends fitted in and supported by the plate fixture guides 44, 46, respectively. The plate 34 also has side edges fitted in and supported by the plate fixture guides 44, 46. As shown in FIGS. 2 and 3, the plate 34 includes a closure region 48 in the form of a vertically elongate high-resistance strip which is displaced slightly from the center to the left or right, the closure region 48 having a predetermined width. The plate 34 also has a plurality of through holes 50a on one side of the closure region 48 and a plurality of through holes 50b on the other side of the closure region 48. These through holes 50a, 50b serve as resistive-body air passages for dividing air that is delivered from the air blower unit 12 to the plate 34 into air flows through the through holes 50a, 50b. The dimensions and position of the closure region 48 and the dimensions and numbers of the through holes 50a, 50b are determined in order to provide a desire air speed distribution in the heater unit 16.

Operation of the vehicle heating apparatus 10 will be described below.

When the air blower 20 is energized, it draws ambient air into the blower case 22. The drawn air is then introduced from the inlet joint 24 into the heater duct 18 and then delivered to the plate 34 that is positioned near the outlet joint 26.

In the first embodiment, the plate 34 has the closure region 48 displaced slightly from the center to the left or right and the through holes 50a, 50b on the respective sides of the closure region 48 for the purpose of obtaining the same air speed distribution when an evaporator is not installed as the air speed distribution when the evaporator is installed. The air that is delivered from the air blower unit 12 into the heater duct 18 and has the greatest air speed and rate in a substantially central region of the heater duct 18 is blocked by the closure region 48 and divided into air flows over opposite sides of the closure region 48, which pass through the through holes 50a, 50b and are then combined and mixed with each other in the vicinity of the outlet joint 26.

The heater unit 16 can thus achieve the same air speed distribution when the evaporator is not installed as the air speed distribution when the evaporator is installed. When the heater core 14 is energized, the heater unit 16 supplies heated air with a desired air speed distribution into the passenger's compartment for an effectively increased heating capability.

Figure 4:
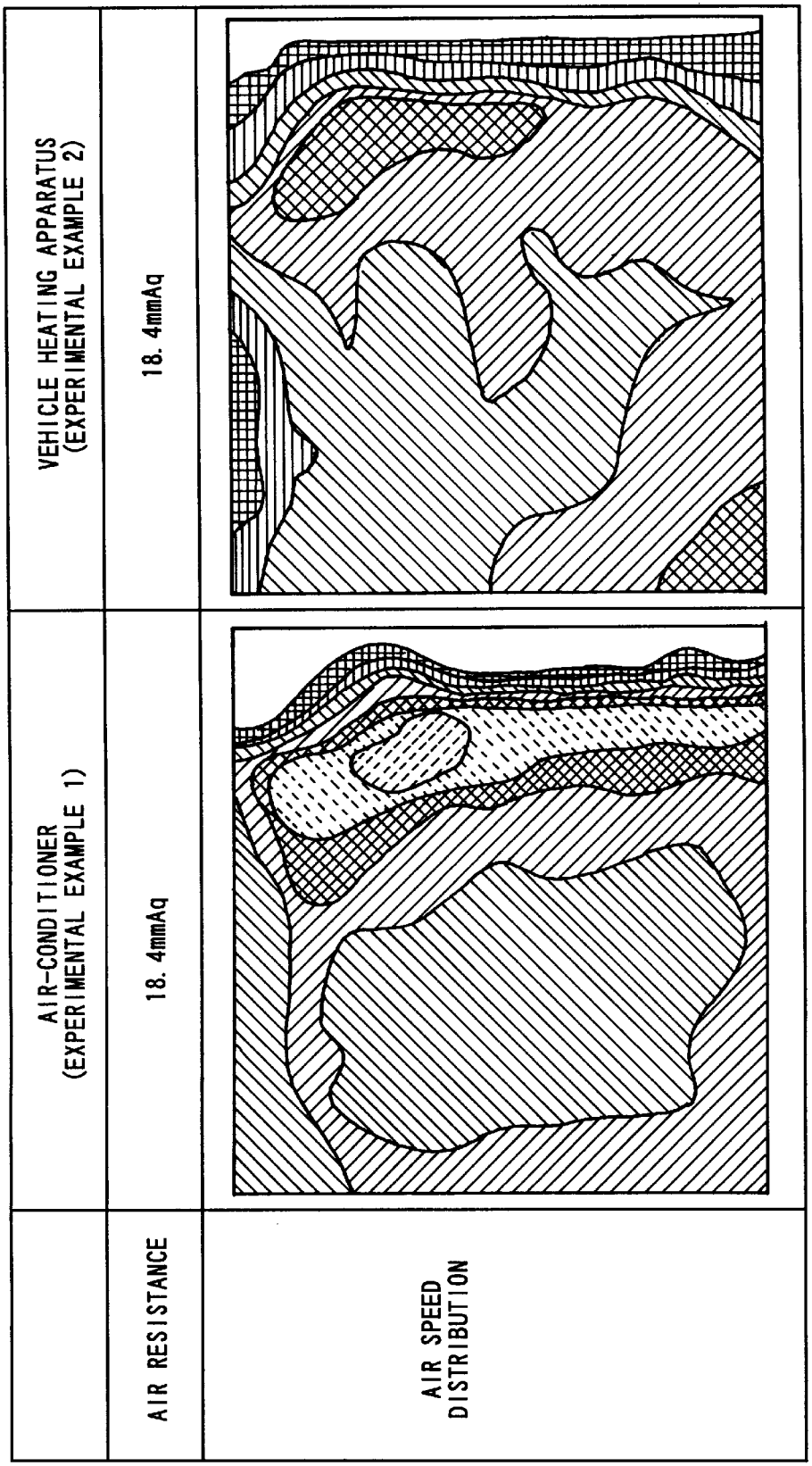
FIG. 4 is a diagram of experimental results of air resistances and air speed distributions of the vehicle heating apparatus when an evaporator and the plate were installed.

An experiment was conducted on an air-conditioner (Experimental Example 1) having a cooling unit with a built-in evaporator and the heating apparatus 10 (Experimental Example 2) according to the first embodiment for detecting air resistances and air speed distributions. FIG. 4 shows the results of the experiment.

With the air-conditioner according to Experimental Example 1, the air speed distribution was localized due to the position of the air blower 20 when the evaporator was installed, resulting in higher air speeds in a region on the right-hand side of the center, as shown in FIG. 4. The heating apparatus 10 according to Experimental Example 2 provided the same air speed distribution as when the evaporator was installed, by selecting the position and dimensions of the closure region 48 and the dimensions and numbers of the through holes 50a, 50b in view of the air speed distribution obtained when the evaporator was installed.

With the heating apparatus 10 according to Experimental Example 2, simply by selecting the position and dimensions of the closure region 48 and the dimensions and numbers of the through holes 50a, 50b, it is possible to change the air speed distribution of the air delivered to the heater unit 16, and to provide a uniform air speed distribution as well as the same air speed distribution as when the evaporator was installed. Consequently, the heating capability of the vehicle heating apparatus 10 can be effectively increased simply by using the plate 34 in the heater duct 18.

Because the plate 34 is positioned in the heater duct 18 near the outlet joint 26 by the guides 44, 46, the air flows divided and transmitted through the plate 34 are combined and mixed with each other in the vicinity of the outlet joint 26, immediately after which the air is delivered into the heater unit 16. Therefore, the air speed distribution in the heater duct 18 is prevented from suffering changes which would otherwise occur if the plate 34 were positioned centrally in the heater duct 18, and the air with a desired air speed distribution is always supplied to the heater unit 16.

Other plates than the plate 34 may be used insofar as they have a high-resistance region in its center and resistive-body air passages for dividing air into air flows over opposite sides of the high-resistance region.

Figure 5:
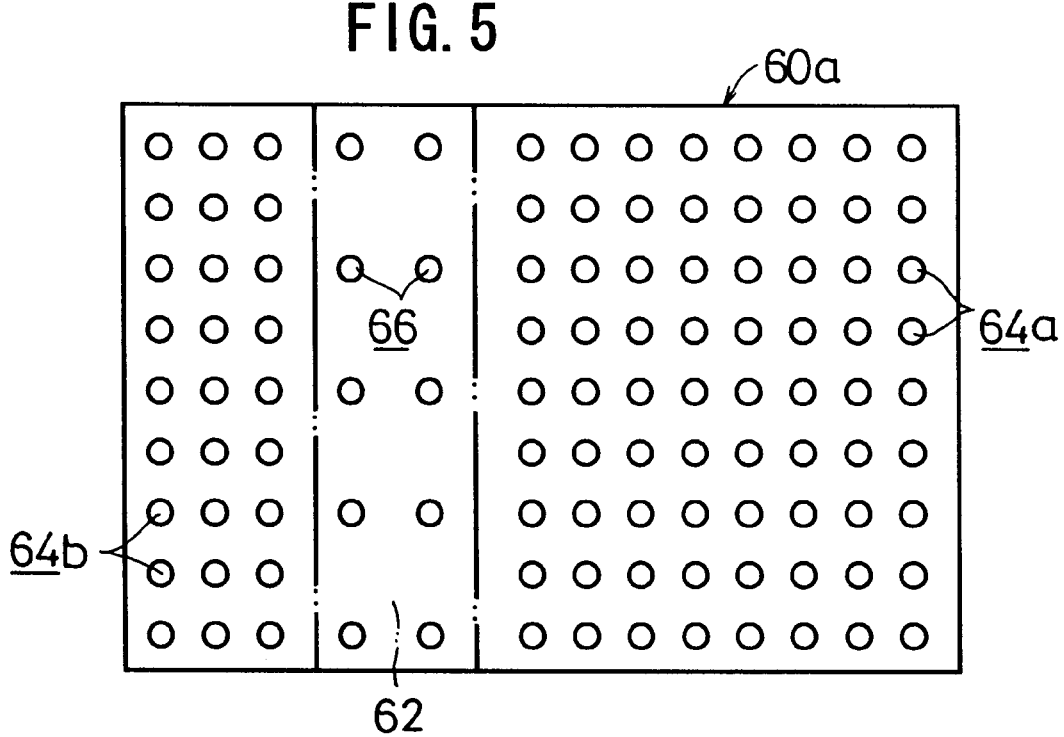
FIG. 5 is a front elevational view of a modified plate that can be used in place of the plate shown in FIG. 2.
Figure 6:
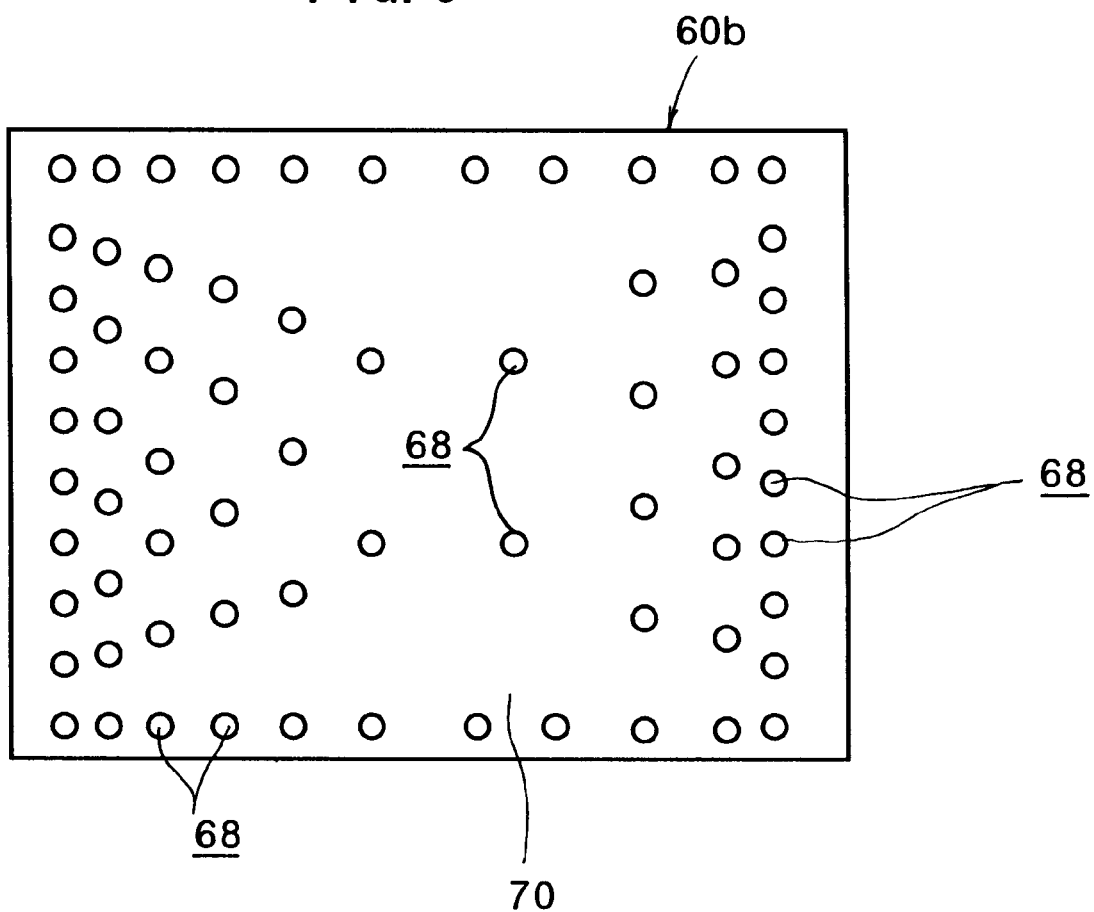
FIG. 6 is a front elevational view of another modified plate that can be used in place of the plate shown in FIG. 2.

FIGS. 5 and 6 show modified plates 60a, 60b, respectively, that can be used in place of the plate 34.

As shown in FIG. 5, the plate 60a has a closure region 62 of given dimensions at a given position and a plurality of through holes 64a on one side of the closure region 62 and a plurality of through holes 64b on the other side of the closure region 62. The closure region 62 has a smaller number of through holes 66 defined therein and spaced apart at an interval or pitch greater than the pitch between the through holes 64a, 64b. These through holes 66 allow a smaller amount of air from the air blower 60 to pass through the closure region 62 to the heater unit 16 than the air passing through the through holes 64a, 64b.

Most of the air applied to the plate 60a is divided and flows through the through holes 64a, 64b in a region downstream of the plate 60a, and the remaining smaller amount of air passes through the through holes 66 into the region downstream of the plate 60a. Therefore, three air flows are combined and mixed with each other, providing a desired air speed distribution.

As shown in FIG. 6, the plate 60b has a plurality of through holes 68 in vertical rows that are spaced at progressively greater intervals from the opposite sides of the plate 60b toward the center thereof. Therefore, the density of the through holes 68 is progressively smaller, i.e., the through holes 68 are progressively coarser, from the opposite sides of the plate 60b toward the center thereof.

The plate 60b has a closure region 70 where the through holes 68 are coarsest which divides the air applied thereto into air flows on opposite sides of the closure region 70.

Therefore, either the plate 60a or the plate 60b used in place of the plate 34 is as effective and advantageous as the plate 34.

Figure 7:
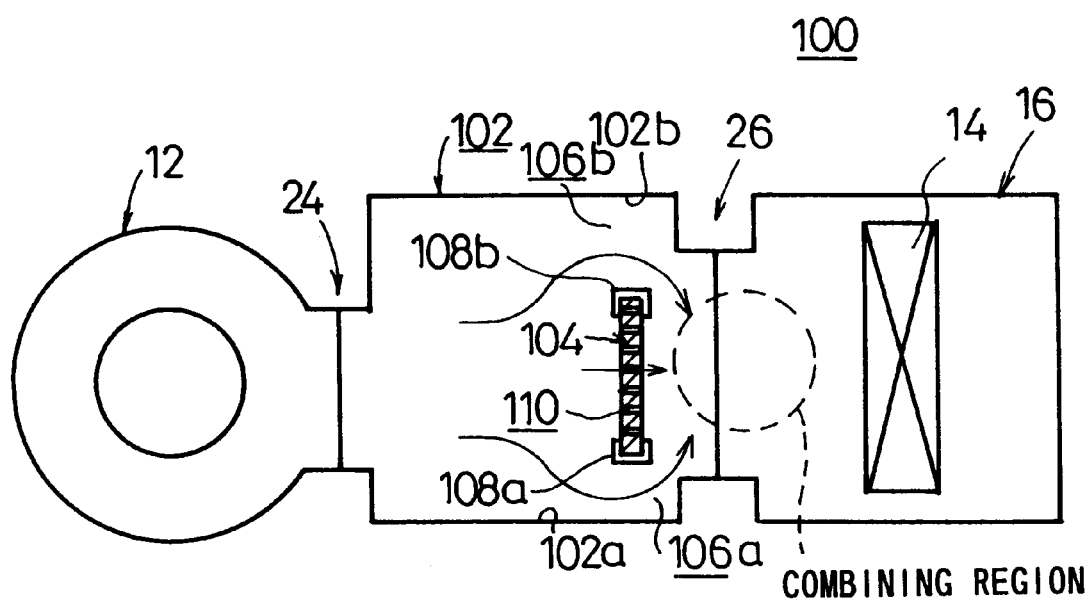
FIG. 7 is a schematic cross-sectional view of a vehicle heating apparatus according to a second embodiment of the present invention.

FIG. 7 shows a vehicle heating apparatus 100 according to a second embodiment of the present invention. The vehicle heating apparatus 100 comprises an air blower unit 12, an air heater unit 16, and a heater duct 102 disposed between the air blower unit 112 and the air heater unit 16. The heater unit 102 has an inlet joint 24 connected to the air blower unit 12. The heater duct 102 houses a plate (resistive body) 104 in the vicinity of an outlet joint 26 of the heater duct 102. The plate 104 has opposite sides spaced from corresponding inner wall surfaces 102a, 102b of the heater duct 102 by respective spaces or gaps 106a, 106b. The plate 104 is held in position by guides 108a, 108b placed in the heater duct 102.

Figure 8:
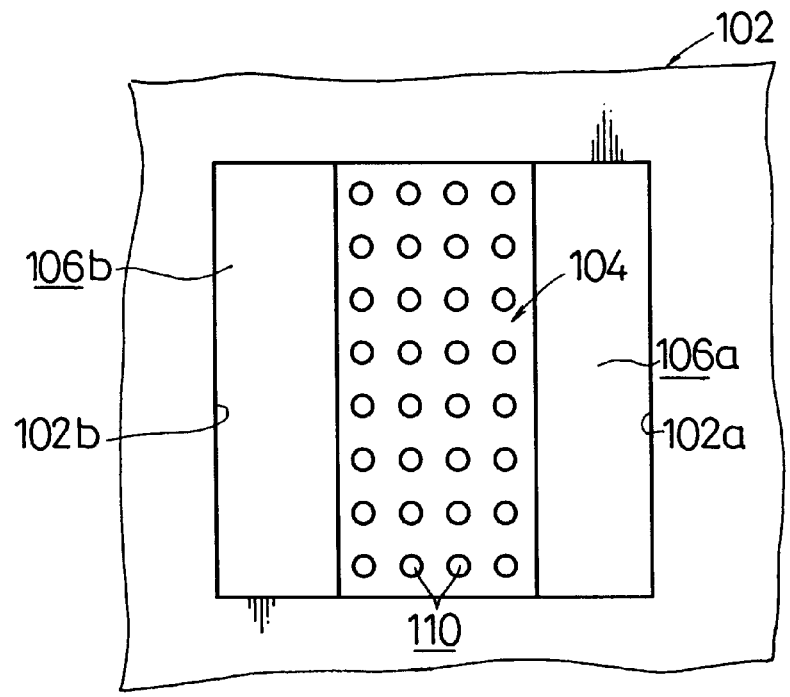
FIG. 8 is a front elevational view of a plate of the vehicle heating apparatus shown in FIG. 7.

As shown in FIG. 8, the plate 104 has upper and lower edges held against upper and lower inner wall surfaces of the heater duct 102. The plate 104 also has a plurality of through holes 110 defined therein. The position and width of the plate 104 and the dimensions and positions of the through holes 110 are selected to provide a desired air speed distribution in the heater unit 16.

The vehicle heating apparatus 100 operates as follows: When the air blower 20 is energized, it draws ambient air into the blower case 22. The drawn air is then introduced into the heater duct 102. When the air is applied to the plate 104, most of the air is divided into air flows that flow into and through the spaces 106a, 106b and then are combined and mixed with each other in the vicinity of the outlet joint 26 downstream of the plate 104. The remaining amount of air that has passed through the through holes 110 in the plate 104 also Joins the air in the vicinity of the outlet joint 26. The air is then supplied to the air heater unit 16 with the same localized air speed distribution as when the evaporator is installed or a uniform air speed distribution. The air heated by the air heater unit 16 is thus effective to provide an increased heating capability.

Figure 9:
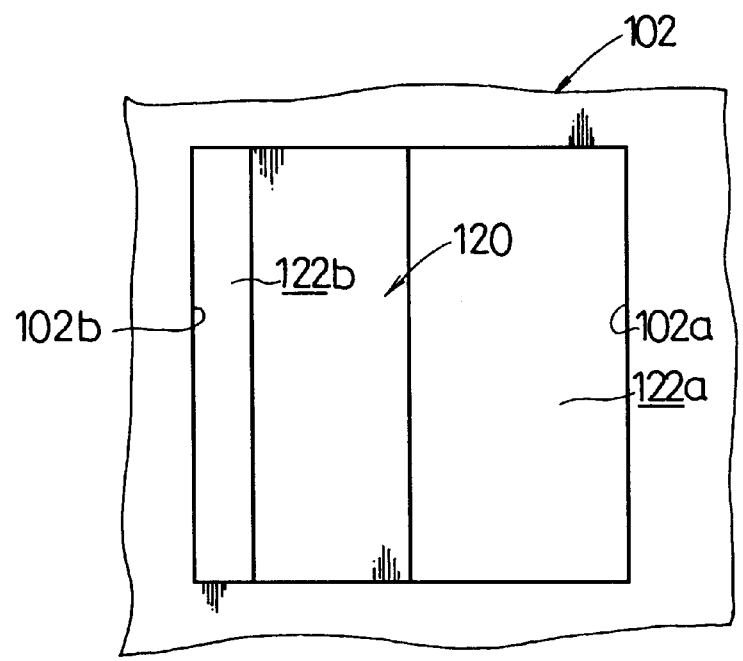
FIG. 9 is a front elevational view of a modified plate that can be used in place of the plate shown in FIG. 8.

The plate 104 may be replaced with a modified plate 120 shown in FIG. 9. The plate 120 comprises a vertically elongate rectangular plate free of through holes. The plate 120 with a predetermined width is disposed in the heater duct 102 at a preselected position, creating spaces or gaps 122a, 122b defined between the opposite sides of the plate 120 and the inner wall surfaces 102a, 102b of the heater duct 102. Air delivered from the air blower unit 12 is divided into air flows that flow into and through the spaces 122a, 122b and then are combined and mixed with each other in the vicinity of the outlet Joint 26 downstream of the plate 120.

As described above, the resistive body is disposed in the vicinity of the outlet Joint of the heater duct, and has the resistive-body air passages for dividing delivered air flowing in the heater duct into air flows over the opposite sides of the resistive body. Therefore, the delivered air flowing centrally in the heater duct at the highest air speed is blocked by the resistive body, and the air flows are combined and mixed with each other downstream of the resistive body, producing an air flow that is supplied to the air heater unit at a desired air speed distribution.

Consequently, it is possible to obtain, easily and reliably, the same localized air speed distribution when the evaporator is not installed as the localized air speed distribution when the evaporator is installed, with the resistive body that is simply mounted in the heater duct. The heating capability of the vehicle heating apparatus is high because of the localized air speed distribution. Inasmuch as the resistive body is disposed near the outlet joint of the heater duct, the air flows divided by the resistive body and then combined and mixed with each other do not change the air speed distribution before reaching the air heater unit. Thus, the desired localized air speed distribution can be obtained in the air heater unit.

Although certain preferred embodiments of the present invention has been shown and described in detail, it should be understood that various changes and modifications may be made therein without departing from the scope of the appended claims.

What is claimed is:

1. A vehicle heating apparatus comprising:

an air blower unit for discharging air from air outlets in a passenger's compartment;

an air heater unit with a built-in heater core for heating the air from said air blower unit before the air is discharged from said outlets;

a duct disposed between said air blower unit and said air heater unit, said duct being capable of housing an evaporator; and a resistive body immovably and fixedly disposed in said duct adjacent an outlet thereof when said evaporation is not present in said duct, for generating a predetermined air speed distribution pattern in said heater unit which is equivalent to a pattern produced when said evaporator is present;

said resistive body having resistive-body air passages and a closure region for dividing air flowing through said heater duct into respective air flows which flow through respective sides of said resistive body on opposite sides of said closure region.

2. The vehicle heating apparatus according to claim 1, wherein said resistive body has peripheral edges held against inner wall surfaces of said heater duct, and said resistive-body air passages comprise a plurality of through holes defined in at least opposite sides of said resistive body.

3. The vehicle heating apparatus according to claim 2, wherein said closure region has a predetermined width and is displaced laterally from a center of said resistive body, said through holes being positioned on each side of said closure region.

4. The vehicle heating apparatus according to claim 3, wherein said closure region has a plurality of through holes defined therein and spaced at a greater pitch than said through holes on each side of said closure region.

5. The vehicle heating apparatus according to claim 2, wherein said through holes are progressively coarser from the opposite sides of said resistive body toward the center thereof.

6. The vehicle heating apparatus according to claim 1, wherein said resistive body has opposite side edges spaced from respective inner wall surfaces of said duct, thereby defining respective air passages on either side of said resistive-body.

7. The vehicle heating apparatus according to claim 6, wherein through holes are defined in said resistive body.

8. The vehicle heating apparatus according to claim 6, wherein said resistive body comprises a closure plate.

9. The vehicle heating apparatus according to claim 1, wherein said air speed distribution pattern is made up of respective areas in which finer or coarser air speed distributions occur in different regions of said resistive body, and wherein said air flows are divided on both of respective left and right sides of said resistive body.

10. The vehicle heating apparatus according to claim 9, further comprising guides which are respectively provided on upper and lower duct portions making up said duct and which are disposed proximate to said outlet, said guides fixing the position of the resistive body.

11. The vehicle heating apparatus according to claim 1, further comprising guides which are respectively provided on upper and lower duct portions making up said duct and which are disposed proximate to said outlet, said guides fixing the position of the resistive body.

* * * * *